United States Patent
Kuczynski et al.

(10) Patent No.: US 9,580,579 B2
(45) Date of Patent: *Feb. 28, 2017

(54) POLYMER COMPRISING MESOPOROUS FLAME RETARDANT

(71) Applicant: International Business Machines Corporation, Armonk, NY (US)

(72) Inventors: Joseph Kuczynski, North Port, FL (US); Melissa K. Miller, Research Triangle Park, NC (US); Heidi D. Williams, Cary, NC (US); Jing Zhang, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/564,198

(22) Filed: Dec. 9, 2014

(65) Prior Publication Data

US 2016/0137819 A1    May 19, 2016

Related U.S. Application Data

(63) Continuation of application No. 14/546,082, filed on Nov. 18, 2014.

(51) Int. Cl.
*C08K 7/24* (2006.01)
*C08K 3/26* (2006.01)
*C08K 9/12* (2006.01)
*C08K 9/00* (2006.01)

(52) U.S. Cl.
CPC ............... *C08K 7/24* (2013.01); *C08K 3/26* (2013.01); *C08K 9/00* (2013.01); *C08K 9/12* (2013.01); *C08K 2003/267* (2013.01); *C08K 2201/005* (2013.01); *C08K 2201/006* (2013.01)

(58) Field of Classification Search
CPC ............... C08K 3/26; C08K 7/24; C08K 9/12
USPC ......... 523/218; 252/604, 606, 609; 106/463; 524/424, 436
See application file for complete search history.

(56) References Cited

U.S. PATENT DOCUMENTS

| | | | |
|---|---|---|---|
| 4,292,188 A | 9/1981 | Barone et al. | |
| 4,751,137 A | 6/1988 | Halg et al. | |
| 4,997,694 A | 3/1991 | Legare | |
| 6,667,358 B1* | 12/2003 | Aoyama | C08L 23/08 523/206 |
| 7,125,924 B2 | 10/2006 | Credali et al. | |
| 2013/0078394 A1 | 3/2013 | Taylor | |
| 2014/0087186 A1 | 3/2014 | Goberti et al. | |
| 2015/0298984 A1* | 10/2015 | Stromme | A61Q 19/00 428/402 |

FOREIGN PATENT DOCUMENTS

| | | |
|---|---|---|
| GB | 1511279 A | 5/1978 |
| GB | 1519781 A | 8/1978 |
| JP | 11255943 A | 9/1999 |

OTHER PUBLICATIONS

Morgan, Alexander B. et al., The effectiveness of magnesium carbonate-based flame retardants for poly (ethlene-co-vinyl acetate) and poly(ethylene-co-ethyl acrylate), Fire and Materials, May 23, 2007, pp. 387-410, Wiley InterScience, Hoboken, United States.
U.S. Appl. No. 14/546,082, entitled Polymer Comprising Mesoporous Flame Retardant, filed Nov. 18, 2014.
Appendix P: List of IBM Patents or Patent Applications Treated as Related.

* cited by examiner

*Primary Examiner* — Edward Cain
(74) *Attorney, Agent, or Firm* — Patterson + Sheridan, LLP

(57) ABSTRACT

Embodiments of the disclosure generally provide flame retardant compositions and methods comprising organic polymers, mineral fillers, high surface area mineral fillers and process aids. Compositions of the disclosure additionally are comprised of high surface area hydrated metal carbonate fillers, including the mesoporous amorphous magnesium carbonate filler Upsalite. The filler's porous structure and high surface area provides high water capacity, enhanced physical and chemical interaction with a polymer in composite, lower by weight loadings of filler in a composite, as well as effective flame retardancy.

20 Claims, 2 Drawing Sheets

| MINERAL | CHEMICAL FORMULA | APPROXIMATE ONSET OF DECOMPOSITION (°C) |
|---|---|---|
| ALUMINIUM HYDROXIDE | $Al(OH)_3$ | 180 - 200 |
| HYDROMAGNESITE | $Mg_5(CO_3)_4(OH)_2 \cdot 4H_2O$ | 220 - 240 |
| DAWSONITE | $NaAl(OH)_2CO_3$ | 240 - 260 |
| MAGNESIUM HYDROXIDE | $Mg(OH)_2$ | 300 - 320 |
| MAGNESIUM CARBONATE SUBHYDRATE | $MgO \cdot CO_{2(0.96)}H_2O_{(0.3)}$ | 340 - 350 |
| BOEHMITE | $AlO(OH)$ | 340 - 350 |
| CALCIUM HYDROXIDE | $Ca(OH)_2$ | 430 - 450 |
| UPSALITE | $Mg(CO_3) \cdot xH_2O$ | 400 - 450 |

FIG. 1

POLYMER COMPRISING MESOPOROUS FLAME RETARDANT

CROSS-REFERENCE TO RELATED APPLICATIONS

This application is a continuation of co-pending U.S. patent application Ser. No. 14/546,082, filed Nov. 18, 2014. The aforementioned related patent application is herein incorporated by reference in its entirety.

BACKGROUND

The present disclosure generally relates to flame retardant polymer composites.

Flame retardants are incorporated into polymers to achieve a desired flame resistance, and the resulting materials may be formed or molded into objects for use in a number of fields including construction, automotive, aerospace, and in wire, cable, and connector applications. Flame retardants suppress combustion by acting either through the vapor phase or the condensed phase by chemical and/or physical mechanisms. Some general classes of flame retardants are summarized below:

1. Fillers: generally dilute the combustible polymer fuel and reduce concentration of decomposition gases.
2. Hydrated fillers: may include properties described above, and also release non-flammable gases, such as water and carbon dioxide to suppress combustion, and/or decompose endothermically to cool the pyrolysis zone at the combustion surface.
3. Halogens, phosphorus and antimony act in the vapor phase by a radical mechanism to interrupt the exothermic processes and to suppress combustion. Phosphorus also acts in the condensed phase to promote char formation creating a barrier to inhibit gaseous products from diffusing to the flame and shielding the polymer from heat and air.
4. Intumescent materials swell when exposed to fire or heat to form a porous foamed mass acting as a barrier.

The trend in recent years, driven principally by environmental and safety concerns, has been towards an increase in use of halogen-free flame retardants such as the hydrated mineral fillers. The largest and most commonly used group of hydrated mineral flame retardants are the metal hydroxides, such as aluminum hydroxide and magnesium hydroxide. Metal hydroxides generally act as flame retardants by releasing water vapor through endothermic decomposition, and leave behind a thermally stable inorganic residue. When used as a filler in polymer composites, they may also dilute the combustible polymer decomposition products.

Recently, synthetic and naturally occurring metal carbonates, including magnesium carbonate hydroxide pentahydrate, hydromagnesite and huntite, have gained popularity and have begun to replace metal hydroxides as flame retardants in polymers. The metal carbonate endothermic decomposition temperature range is similar to that of commonly used polymers, and their release of water and carbon dioxide are advantageous. Two examples shown below illustrate the flame retardant endothermic decomposition products derived from two metal carbonates:

Hydromagnesite

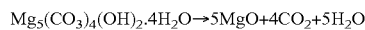
$Mg_5(CO_3)_4(OH)_2 \cdot 4H_2O \rightarrow 5MgO + 4CO_2 + 5H_2O$

Huntite

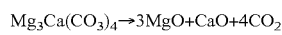
$Mg_3Ca(CO_3)_4 \rightarrow 3MgO + CaO + 4CO_2$

However, as generally compared to traditional flame retardants, including phosphorous based intumescent and halogen-containing formulations, hydrated mineral fillers typically require filler levels of up to 70% by weight of the polymer composite to achieve acceptable combustion resistance. High filler loadings in a polymer composite can be a disadvantage because of the negative impact on the mechanical properties of the molded object such as lower elongation at break, lower tensile strength and higher brittleness. Moreover, high filler loadings and lack of filler/polymer compatibility may lead to processing difficulties such as incomplete dispersion, high mixing torque, and gross phase separation of the components during processing and in a molded article.

In addition to the above effects that are a result of high weight percent filler relative to polymer in a composite, inorganic mineral fillers and organic polymers may not interact or mix well because of non-complementary and repulsive chemical and physical forces. For example, a polar inorganic filler may repulse a non-polar organic polymer, and crystalline portions of a polymer may physically exclude or repulse a filler particle, so a highly crystalline polymer such as high density polyethylene may have difficulty incorporating a sufficient amount of filler for flame retardancy, and thus the filler would mostly segregate in the amorphous regions of the polymer.

Another important factor to consider is the amount or number of waters of hydration or water molecules associated with the mineral filler. Some hydrated mineral fillers release more water than others. For example, as shown above, hydromagnesite releases five water molecules per mole of hydromagnesite. The amount of flame retardant water available for release is limited by the stoichiometry of the material.

Because of the above challenges, there is a need for an environmentally friendly polymer material comprising a non-halogen flame retardant mineral filler that is well dispersed and mixed with a polymer at lower weight percent loadings, and wherein the physical properties of the materials, and articles made from the material, are not compromised by the presence of the filler. Moreover, it would be an advantage for the filler to have a high surface area for increased physical and chemical interaction with the polymer, as well as a high water capacity to cool and quench a flame.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

FIG. 1 is a table of flame retardant mineral fillers according to some embodiments of the disclosure.

DETAILED DESCRIPTION

Figure 2:
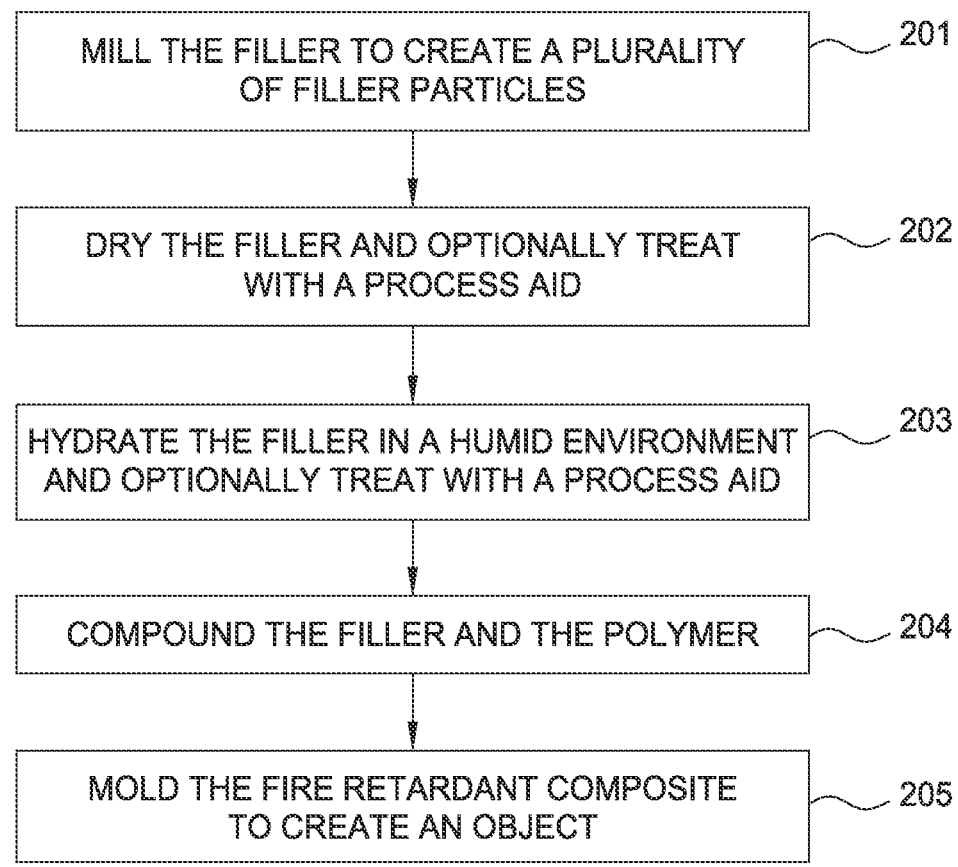
FIG. 2 is a flowchart summarizing a method according to another embodiment.

The present disclosure provides flame retardant compositions and methods comprising organic polymers, mineral fillers, high surface area hydrated mineral fillers and process aids. Compositions of the disclosure additionally include high surface area hydrated metal carbonate fillers such as a mesoporous amorphous magnesium carbonate filler. In some embodiments, the mesoporous amorphous magnesium carbonate filler is Upsalite, having a plurality of pores between about 2 nm and about 50 nm, and a surface area of about 800 $m^2$/gram, measured by nitrogen sorption isotherms according to the Brunauer-Emmet-Taylor (BET) method. Upsalite's porous structure and high surface area provides additional flame retardant benefits including high water capacity and desiccant properties, enhanced physical and chemical interaction with a polymer in a mixture, lower loadings of filler in the mixture, as well effective flame retardancy from water and carbon dioxide out-gassing and endothermic decomposition.

The polymer composites of the disclosure comprising a mesoporous amorphous magnesium carbonate filler, such as Upsalite, may exhibit significant improvements in flame retardancy due to the ability of the mesoporous filler to adsorb and retain large quantities of water upon, over, and within the filler mesoporous structure surfaces. In other words, the high surface area mesoporous structure of Upsalite, comprising of pores between 2 nm and 50 nm, and a generally rough surface morphology further comprising associated recesses and passages, is well suited for the inclusion, adsorption and retention of water molecules. For example, in some cases, the mesoporous structure of Upsalite yields a surface area of about 800 $m^2$/gram, which is between about 5 and about 10 times greater than conventional flame retardant mineral fillers, and thus provides a large surface area for physical and/or chemical adsorption of flame retardant water molecules. Complementing the high surface area is an intrinsic high affinity for water molecules which results in desiccant properties. For example, Upsalite's water adsorption capacity is about 50% larger than that of the hygroscopic zeolite-Y, a benchmark desiccant/water adsorbing media commonly used in industry and in science, as measured by water vapor sorption isotherms according to the Brunauer-Emmet-Taylor (BET) method.

Of further utility are the reversible dehydration and hydration properties of Upsalite, wherein the filler does not degrade or decompose after multiple dehydration and hydration cycles, thus enabling the practitioner to select a water content for the filler, starting from a dehydrated or partially hydrated state. As described in further detail later in the disclosure, the water content may be further manipulated or controlled by modifying the filler surface with hydrophobic coupling agents, including but not restricted to silanes, titanates, zirconates, aluminates, carboxylic acids, esters, and phosphates. In this way, Upsalite may be a water content tunable filler. These properties generally make Upsalite a unique hydrated mineral filler, since other hydrated mineral fillers are generally restricted by chemical stoichiometry.

A further benefit of a filler such as mesoporous Upsalite is the greater surface area for interaction with a polymer, both physically and chemically, which leads to more effective filler particle mixing, dispersion, and a lower weight percent filler needed to achieve acceptable flame retardancy. For example, an effective flame retardant polymer material, which may be a composite, typically contains a plurality of filler particles that are dispersed within a polymer. The individual filler particles or small clusters of particles may be surrounded and may be encapsulated by the polymeric material. A homogeneous dispersion of particles throughout the polymer achieves multiple benefits including ease of processing, lower filler loadings by weight of the polymer material, and greater flame retardancy. More specifically, a homogeneous filler dispersion may be obtained when a polymer physically coats, adheres to and interlocks to the surfaces of the filler particles. Fortuitously, the high surface area of a mesoporous filler such as Upsalite provides a plurality of rough features, including pores, tunnels and galleys, for the polymer to physically bond to, in a lock and key manner. In some embodiments, a flame retardant material comprising Upsalite may have between about 5 percent and about 50 percent by weight filler. By contrast, a conventional crystalline mineral filler typically features a microscopically smooth surface that does not supply anchor points for the polymer, and requires weight percent filler loadings as high as 70%.

In further embodiments, the filler surface may be modified to chemically bond to, or otherwise be attracted to a polymer. In one aspect, a coupling agent may be added. In another aspect, chemical functionality, such as anhydride groups, may be grafted onto the polymer. Such groups may be attracted to the filler surface by a number of interactions including dipole-dipole interactions, hydrogen bonding, and ionic forces. In general, embodiments of the disclosure yield unexpected advantages in the use of high surface area mesoporous fillers for flame retardant polymer materials, including a greater interaction and dispersion of filler particles within the material, a substantially reduced weight percent loading of the filler in the material, as well as a high water content that is tunable and reversible. Additionally, a mesoporous filler, such as Upsalite, has a high affinity and capacity for water, which yields additional flame retardancy, in concert with the intrinsic property flame quenching carbonate endothermic decomposition.

Prior to compounding, mixing, or blending with a polymer, a flame retardant filler may be chosen to match a particular polymer system based on the filler decomposition temperature. For example, to prevent degradation of the material by foaming during the melt compounding step, a filler should be selected that has a decomposition temperature greater than the melt processing and/or molding temperature of the polymer that it is mixed with. For comparison, the decomposition temperatures of some mineral fillers are shown in FIG. 1. Some fillers have decomposition onset temperatures that may include the release of water, carbon dioxide or both. Also shown in FIG. 1, and in contrast to commonly used flame retardant fillers, Upsalite and/or related mesoporous fillers such as mesoporous amorphous magnesium carbonate may have a broader range of processing utility. For example, Upsalite may have two types of adsorbed waters that effuse over a broad temperature range. Also, Upsalite may contain physically adsorbed water molecules that are included within the porous structure, and those water molecules circumnavigate a tortuous path for flame suffocation or cooling. This in effect raises the effective temperature of effusion for the adsorbed waters, and therefore the waters physically trapped within the Upsalite porous structure are effused or desorbed at temperatures between about 125° C. and about 250° C.

In addition to the physically bound water, Upsalite contains chemically adsorbed water, bound by polar interactions and/or hydrogen bonding within the mesoporous structure, that effuses or desorbs at temperatures between about 250° C. and about 300° C. The combination of these two types of adsorbed water ultimately yields a broader range of water effusion for flame retardancy and cooling, that is, between about 125° C. and 300° C. Finally, Upsalite and/or related mesoporous fillers may irreversibly decompose between about 400° C. and about 450° C. to produce carbon dioxide which may suffocate a flame or dilute the oxygen available for combustion.

As noted above, the broad range of decomposition of Upsalite and/or related mesoporous fillers, between about 125° C. and about 450° C., produces water and carbon dioxide flame quenching species and endothermic or cooling heat flow. It is a further advantage that flame retardant composites comprising Upsalite and/or related mesoporous fillers have tunable or selectable moisture content, and the material can be reversibly hydrated and dehydrated in contrast to other flame retardant hydrated mineral fillers. This allows for selected water content for specific processing parameters and specific polymers.

FIG. 2 is a flowchart depicting steps associated with a method 200 used to form a flame retardant material according to some embodiments of the disclosure. At 201, one or more flame retardant fillers, optionally including Upsalite, are combined and milled to a particle size from between about 0.010 microns and about 25 microns. The median particle diameter, or D50, may be between about 1 micron and about 10 microns. Any number of milling techniques may be used to achieve the particle size distribution, including, but not restricted to ball milling, bead milling, attritor milling, sand milling, horizontal milling, vertical milling, and vibratory milling, and wherein the desired particle size is generally produced by controlling the time, applied energy, and the size of the grinding media. Particle size measurements may be performed using any number of techniques including sieve, sedimentation, Coulter, and laser light scattering analyses.

An unexpected benefit of the compositions comprising Upsalite and related mesoporous fillers is the ease of milling, crushing, and shearing of the particles and particle aggregates due to the low fracture strength of the porous structure. The low fracture strength of the mesoporous low density particles and aggregates further enables the preparation of smaller particles in the milling step, such as particles that are about 1 micron or less, and a D50 from about 1 micron to about 10 microns. Ultimately, the dispersion of the porous particles in the polymer material is aided by the fragmentation and dispersion of the fragile mesoporous particles, and thus produces a flame retardant polymer composite with greater filler homogeneity, and lower percent by weight loading of filler in the material, in contrast to conventional fully dense crystalline mineral fillers.

At 202, the filler may be dried at temperatures from between about 95° C. and about 150° C., such as between about 100° C. and 125° C., under a vacuum pressure between about $10^{-1}$ torr and about $10^{-3}$ torr. The time of drying may depend on amount of filler to be dried, and the degree of dehydration desired. The time needed to reach the target water content may be between about 1 hour and about 10 hours. For example, 100 grams of Upsalite filler may be dehydrated at about 95° C. at $10^{-3}$ torr for 10 hours, so that the material has a water content of about 0.01 grams of water/gram filler or less.

At this juncture, the practitioner may optionally choose to treat the dehydrated or partially hydrated filler with a process aid such as a coupling agent, to tune the polarity or hydrophilic/hydrophobic character of the filler surface. As mentioned prior, Upsalite and/or related mesoporous fillers may be advantageously treated with process aids to control the water content, the water release temperature, and for improved polymer compatibility. By treating the mesoporous filler with a coupling agent at 202, where the filler is in a dehydrated or partially hydrated state, the water uptake may be controlled, as well as the water effusion or desorption when heated. This may be desirable in later processing steps, where excess water may cause undesired polymer foaming An additional benefit of treating the filler surface with a coupling agent is the modification of the filler surface for polymer compatibility and enhanced compounding, mixing and dispersion with a polymer. For example, in one embodiment, Upsalite particles are coated with a fatty acid process aid, or coupling agent, such as stearic acid. Here, the polar carboxylate portion of the fatty acid binds or interacts with the filler surface and provides a hydrophobic carbon tail or appendage with a greater affinity for the carbon containing polymer. As mentioned above, the process aid may also slow or prevent water adsorption or desorption from within, or onto the filler particle due to steric effects and increased hydrophobicity. It is envisioned that a process aid may be used to coat the Upsalite filler surfaces and/or the cell pores at any point during the filler dehydration and hydration cycles.

In further embodiments, the process aid may comprise a coupling agent including those selected from the group consisting of silanes, titanates, zirconates, aluminates, carboxylic acids, esters, and phosphates. The coupling agent may be added to the filler directly, or prior to mixing with the polymer, at 202, or alternatively to the polymer-filler mixture, at 204. In one embodiment, the process aid is mixed with the filler using a Robot Coupe™ mixer or similar, prior to mixing with the polymer. The amount of coupling agent to be added to filler or the mixture may vary according to the nature of the coupling agent used and the amount of flame-retardant filler added, and may be between about 0.01% and about 10%, and between about 0.1% and about 5%, and between about 1% and about 3% by weight.

At 203, the Upsalite filler may be partially or fully hydrated, rehydrated, or water capacity saturated, in a humid environment from between about 10% and about 100% relative humidity at about 23° C. In some embodiments, the filler adsorbs 0.11 grams water/gram filler or more at a relative humidity of 10% at room temperature, and 0.22 grams water/gram filler or more at a relative humidity of 90% at room temperature. In some embodiments, the filler may be hydrated to a water content of about 0.22 grams of water/gram filler or greater. The practitioner may optionally choose to treat Upsalite and/or related mesoporous fillers with a coupling agent process aid to control the water content, the water release temperature, and for improved polymer compatibility, which results in enhanced mixing and dispersion with a polymer.

Methods that may be applied to the production of flame retardant polymer materials may be classified as follows: 1) dissolution of a polymer in a solvent, followed by mixing with a filler and subsequent solvent removal; 2), in situ polymerization of monomers and/or oligomers in the presence of the mineral filler, thus trapping the filler by a fast polymerization; 3), in situ formation of the fillers in the polymer and/or solvent media, with in situ polymerization; and 4), direct mechanical blending, mixing, and compounding of the polymer and fillers, typically involving the mixing of the filler with the polymer melt, followed by extrusion, molding, or other shaping processes to produce an article. For the purposes of description, forthwith, we will refer to mixing or blending of a polymer with a filler and other additives as compounding.

At 204, a filler is compounded with a polymer, wherein the polymer may be in a molten state, and the filler may be added to the polymer. This is known as the melt-compounding method, and it takes advantage of well established polymer processing techniques. In this type of method, the shear stress (hydrodynamic force) induced in the polymer melt may be employed for the breakdown of aggregated fillers to the nanoscale. This is an unexpected advantage for the melt-compounding of Upsalite and related mesoporous fillers, because in some embodiments, the low fracture strength of the porous fillers results in more effective crushing, shearing, and breakdown of the particles and particle aggregates, which may further reduce the particle size, and aids dispersion of the filler particles in the polymer. In other embodiments, the filler particles and polymer particles may be dry blended by a low or medium intensity mixer prior to the more intensive melt compounding step, or prepared as a master-batch, followed by further melt processing including the use of a screw extruder.

Non-limiting examples of techniques and equipment used for filler-polymer compounding include, but are not restricted to, kneading, screw extrusion, Branbury mixing, Brabender mixing, and roll milling. Those skilled in the art will appreciate and be familiar with the adjustment of appropriate compounding parameters and metrics including: chamber loading, heat and temperature control, rotor speed, polymer-filler matrix viscosity, torque, average shear rate, and mixing time.

Thermoplastic and thermoset polymers are suitable for compounding with a flame retardant filler such as Upsalite and related mesoporous fillers. Some polymers used in embodiments of the disclosure include: polyolefins, polyesters, polycarbonates, polyetherimides, polyamides, polyimides, polysulfones, acetals, polyether ketones, acrylics, nylons, halogenated polymers, polyphenylenes, polyphenylene ethers, polyphenylene sulfide, ABS combinations, polystyrene, melamine formaldehydes, urea formaldehydes, epoxies, and their copolymers.

In some embodiments, other fillers may be co-mixed with the polymers, and may be selected from the group comprising: carbonate minerals, magnesium carbonate, hydromagnesite, huntite, hydroxide minerals, aluminum trihydroxide, magnesium hydroxide, brucite, boehmite, bauxite, borates, flame retardant synergists, clays, organoclays, and oxides of antimony. The group of fillers is generally comprised of flame retardant fillers or mixtures which may comprise of, or enable synergistic interactions that yield unexpected flame retardancy benefits.

In other embodiments, the polymer may be modified with coupling agent, and/or modified with a chemical functionality that may bind or interact with the filler surface. One example is maleic anhydride grafted onto a polyolefin backbone or side chain, which produces a carboxylate group which may bind to a filler surface. The polymer coupling agents may be added to the polymer melt, and then react in situ with the polymer, or they may be pre-grafted onto a polymer. One example is grafting a coupling functional species onto polyethylene or copolymers of ethylene with an alpha-olefin, by means of a radical reaction. The amount of grafted coupling agent is generally comprised between about 0.05 and about 5 parts by weight, preferably from between about 0.1 and about 2 parts by weight, relative to 100 parts by weight of polyolefin. Polyolefins grafted with maleic anhydride are commonly available as commercial products, such as AMPLIFY™ GR Functional Polymers by Dow Chemical.

Alternatively, the coupling agents of carboxylic or epoxy type mentioned above (for example, maleic anhydride) or silanes containing an ethylenic unsaturation (for example vinyltrimethoxysilane) can be added to the mixture in combination with a radical initiator so as to graft the coupling or compatibilizing agent directly onto the polymer material. Initiators which can be used are organic peroxides, such as tert-butyl perbenzoate, dicumyl peroxide, benzoyl peroxide, di-tert-butyl peroxide and the like. This technique is described, for example, in U.S. Pat. No. 4,317,765.

In further embodiments other additives or process aids may be added to the filler and polymer mixture, or to the polymer melt, and may include lubricants, nucleating agents, extension oils, organic and inorganic pigments, anti-oxidants and UV-protectors, heat stabilizers, and plasticizers.

At 205, the filler-polymer compound is processed into an object by any number of techniques including injection molding, reactive injection molding, blow molding, transfer molding, compression molding, and rotational molding. Other methods used to form and/or shape the object may include, but are not restricted to: stamping, machining, computer numerical control (CNC) machining, water jet cutting, laser cutting, and die cutting.

While the foregoing is directed to embodiments of the present disclosure, other and further embodiments of the disclosure may be devised without departing from the basic scope thereof, and the scope thereof is determined by the claims that follow.

What is claimed is:

1. A method of producing a flame retardant object, comprising:
    milling a flame retardant filler comprising a mesoporous amorphous magnesium carbonate to a particle size between about 0.010 microns and about 25 microns;
    hydrating the filler in a humid environment to a level of at least about 0.11 grams water/gram of filler;
    compounding the hydrated filler with a polymer, to form a flame retardant composite wherein the weight percent of the filler in the flame retardant composite is between about 5 percent and about 50 percent by weight of the flame retardant composite; and
    forming an object from a flame retardant composite.

2. The method of claim 1, wherein the filler comprises Upsalite.

3. The method of claim 1, wherein the polymer comprises a material selected from the group consisting of: polyolefins, polyesters, polycarbonates, polyetherimides, polyamides, polyimides, polysulfones, acetals, polyether ketones, acrylics, nylons, halogenated polymers, polyphenylenes, polyphenylene ethers, polyphenylene sulfide, ABS combinations, polystyrene, melamine formaldehydes, urea formaldehydes, epoxies, and their copolymers.

4. The method of claim 1, wherein the filler is treated with a coupling agent selected from the group comprising silanes, titanates, zirconates, aluminates, carboxylic acids, unsaturated carboxylic acids, anhydrides, esters, and phosphates.

5. The method of claim 1, wherein the coupling agent is chemically bound to the filler surfaces.

6. The method of claim 1, wherein the hydrated filler has a controllable water-effusion temperature of between about 250° C. and about 300° C.

7. The method of claim 1, wherein the hydrated filler is water saturated.

8. The method of claim 1, wherein the polymer or polymer-filler mixture is treated with a coupling agent selected from the group comprising silanes, titanates, zirconates, aluminates, carboxylic acids, unsaturated carboxylic acids, anhydrides, esters, and phosphates.

9. The method of claim 1, wherein a second filler is mixed with the polymer, and the second filler is selected from the group comprising carbonate minerals, magnesium carbonate, hydromagnesite, huntite, hydroxide minerals, aluminum trihydroxide, magnesium hydroxide, brucite, boehmite, bauxite, borates, flame retardant synergists, clays, organoclays, and oxides of antimony.

10. The method of claim 1, wherein the polymer is in a molten state.

11. The method of claim 1, wherein the polymer is dissolved in a solvent and mixed with the filler.

12. The method of claim 1, wherein the polymer is modified with a chemical functional species that binds or interacts with the filler surface.

13. The method of claim 12, wherein the chemical functional species is attached to the polymer by means of a radical reaction.

14. The method of claim 1, wherein a coupling agent is added to the mixture in combination with a radical initiator so as to graft the coupling agent directly onto the polymer material.

15. The method of claim 1, wherein the filler is treated with an additive selected from the group comprising lubricants, nucleating agents, extension oils, organic and inorganic pigments, anti-oxidants and UV-protectors, heat stabilizers, and plasticizers.

16. The method of claim 1, wherein in situ polymerization of monomers and oligomers is in the presence of the filler.

17. The method of claim 1, wherein the coupling agent to be added to the filler is between about 0.01% and about 10% by weight.

18. The method of claim 1, wherein the filler median particle diameter is between about 1 and about 10 microns.

19. The method of claim 1, wherein the flame retardant material decomposes at a temperature of between about 125° C. and about 400° C.

20. The method of claim 1, wherein the filler is hydrated to a level of at least about 0.22 grams water/gram of filler.

* * * * *